United States Patent [19]

Sundquist

[11] 4,159,227
[45] Jun. 26, 1979

[54] DUAL TEMPERATURE DIRECT CONTACT CONDENSER SUMPS

[76] Inventor: Charles T. Sundquist, 1971 Sheridan Pl., Richland, Wash. 99352

[21] Appl. No.: 669,393

[22] Filed: Mar. 22, 1976

[51] Int. Cl.² ............................ C02B 1/04; B01D 3/42
[52] U.S. Cl. ................................. 202/185 A; 202/160; 202/181; 203/1; 203/2
[58] Field of Search .................. 202/185 R, 177, 236, 202/185 A, 160, 206, 181, 193, 196; 203/1, 2, 42, 10, 11; 196/141

[56] References Cited

U.S. PATENT DOCUMENTS

| | | | |
|---|---|---|---|
| 3,249,517 | 5/1966 | Lockman | 202/185 A X |
| 3,440,050 | 5/1969 | Sundquist | 202/185 A X |
| 3,692,634 | 9/1972 | Othmer | 202/185 A X |
| 3,736,235 | 5/1973 | Sundquist | 202/236 X |

Primary Examiner—Wilbur L. Bascomb, Jr.

[57] ABSTRACT

A direct contact condenser of a distillation system has a condenser vessel comprising a vapor space with a vapor inlet, a condensate pump, with the liquids' level defining the top of the sump and the bottom of the vapor space. The thermal efficiency of the system is improved wherein the heat of condensation is concentrated in one of two coolant effluent lines while the other coolant line removes unheated excess liquid coolant. This is accomplished with the use of two temperature sensors at spaced vertical locations of the sump and a liquid level control together regulating the opening and closing of respective valves in respective influent and effluent lines of the sump.

1 Claim, 2 Drawing Figures

DUAL TEMPERATURE DIRECT CONTACT CONDENSER SUMPS

This invention is an improvement to the distillation process 'Distilland Heating with Hot Distillate', U.S. Pat. No. 3,444,050 and also shown in 'Heater Pumps for Distilland Heating with Hot Distillate', U.S. Pat. No. 3,736,235.

This invention can be used to improve the thermal efficiency of evaporation systems using direct contact condensers.

An object of the invention is to maintain condenser inlet vapor temperatures at a high level.

An object of the invention is to collect condenser heat of condensation in one high temperature effluent stream.

An object of the invention is to collect excess direct contact condenser coolant in a separate low temperature effluent stream.

Figures 1, 2:
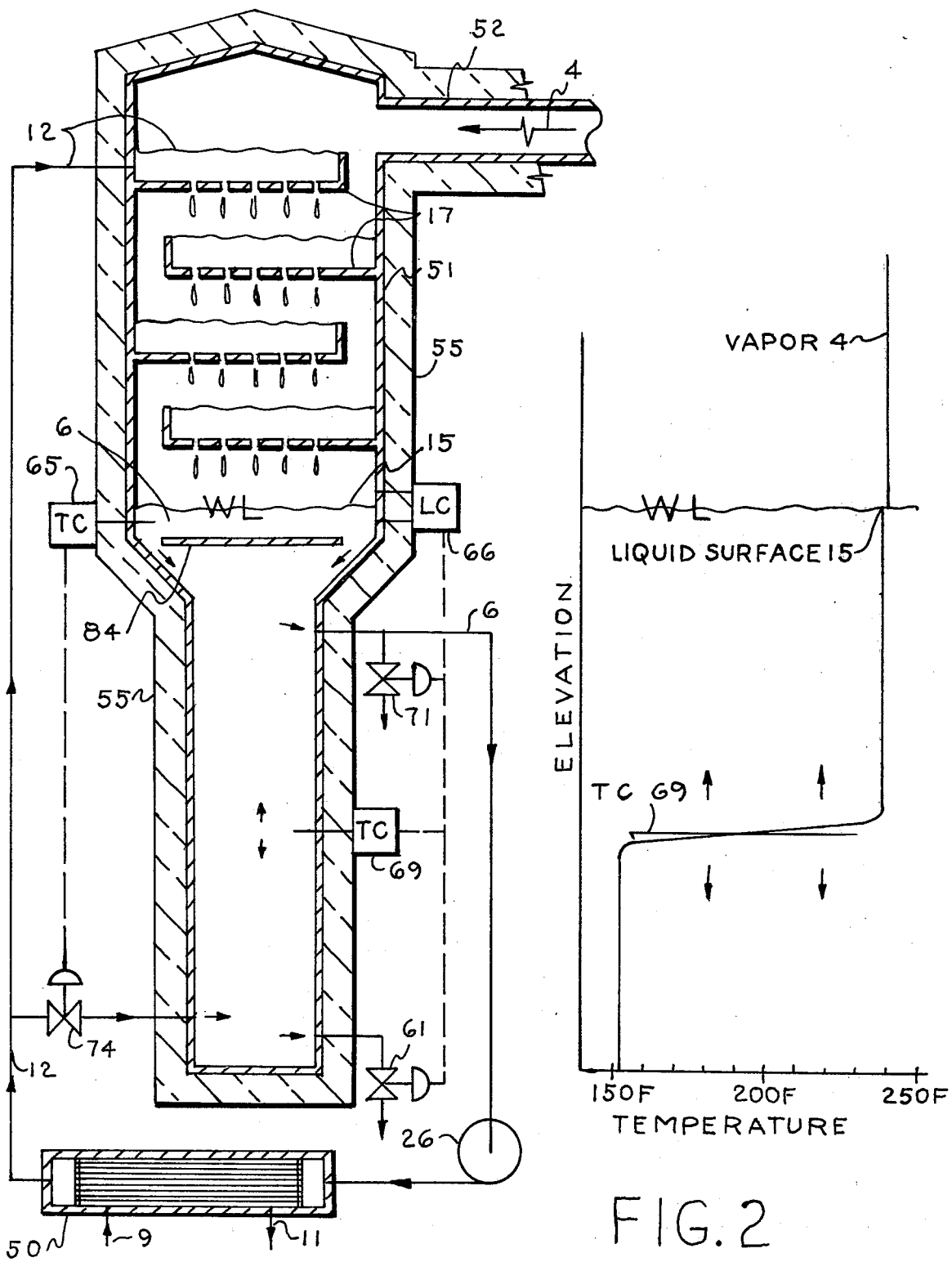
FIG. 1 is a schematic diagram of the invention.
FIG. 2 is a graph of the condenser sump temperatures.

Referring to FIG. 1, vapor 4 flows into condenser 51 through vapor passage 52. Inside the condenser the vapor directly contacts condenser coolant 12 lying in sprinkler trays 17. Coolant and condensate spill downward from tray to tray finally reaching liquid surface 15 at the top of the condenser sump. Sprinkler head means also could be used to provide vapor to coolant contact. Baffle 84 prevents vortex formation in coolant condensate mixture 6 exiting from the upper part of the sump. Insulating jacket 55 reduces heat loss through the condenser walls.

In FIG. 2 a curve shows temperature distribution inside the condenser sump. The ordinate of the graph is elevation. The abscissa is temperature. At the elevation of thermostat 69 there is a sharp gradient in the curve.

Referring again to FIG. 1, coolant condensate mixture 6 is drawn from the upper hotter portion of the sump. It flows through any pump 26 to any liquid cooler 50. The mixture is cooled and emerges as fresh condenser coolant 12. The cooling capacity of this flow of condenser coolant 12 is more than required to condense the flow of vapor 4. A portion of condenser coolant 12 must be diverted to prevent the temperature of coolant condensate mixture 6 from decreasing. The main flow of condenser coolant 12 goes to the top of the condenser where it floods sprinkler trays 17.

The portion of the flow of condenser coolant 12 diverted to the bottom of the condenser sump enters through flow control valve 74, which is under the supervision of thermostat 65. This thermostat senses the temperature of coolant condensate mixture 6 near liquid surface 15. If this temperature goes below set point, more condenser coolant 12 is diverted to the bottom of the sump. If the temperature goes above set point, less condenser coolant 12 is diverted.

The total thermal energy content of the condenser is inversely proportional to the elevation of the temperature gradient of FIG. 2. If the total thermal energy is increasing, the gradient elevation is decreasing and visa versa.

The elevation of the temperature gradient is controlled by an automatic sump drain system. In FIG. 1, this system is composed of thermostat 69, liquid level controller 66, lower drain valve 61 and upper drain valve 71. When liquid surface 15 starts to rise, liquid level controller 66 calls for draining. Thermostat 69 selects which drain valve is to open. If the temperature gradient is too high, lower drain valve 61 opens. If the temperature gradient is too low, upper drain valve 71 is opened.

The combination of parts, functioning as described above, accomplishes the previously described objectives.

The inventor claims:

1. A direct contact condenser with a dual temperature sump including the following: a condenser vessel with a vapor inlet, vapor space, and a condensate sump; condensible vapor in said vapor space, liquid condensate in the sump, and a liquid vapor contact surface defined by the liquid level of said condensate; condenser coolant in a coolant conduit, said coolant conduit feeding said condenser coolant from a liquid cooler to said vapor space where said condenser coolant directly contacts said vapor; hot condensate in the upper part of said sump and cooler condensate in the lower part of said sump; a liquid level controller sensing the elevation of said liquid vapor contact surface, a first thermostat sensing condensate temperature in the sump at an elevation between said hot condensate and said cooler condensate; an upper outlet and upper drain valve for removing said hot condensate from the upper part of said sump; a lower outlet and lower drain valve for removing said cooler condensate from the lower part of said sump; said liquid level controller interconnected with said first thermostat and together controlling the opening and closing of said upper and said lower drain valves to maintain a selected temperature at said first thermostat; a branch coolant conduit from said coolant conduit feeding condenser coolant to a flow control valve and thence to the lower part of said sump; a second thermostat in the upper part of said sump sensing temperature in the region of said liquid vapor contact surface, said flow control valve being controlled by said second thermostat to divert condenser coolant to the lower part of said sump when the temperature of said liquid vapor contact surface falls below a set temperature; a hot condensate conduit conducting hot condensate from said upper drain valve, through a pump and said liquid cooler; hot condensate being cooled in said liquid cooler and exiting as said condenser coolant.

* * * * *